United States Patent
Petersen et al.

(10) Patent No.: US 11,487,126 B2
(45) Date of Patent: Nov. 1, 2022

(54) METHOD FOR CALIBRATING A PROJECTION DEVICE FOR A HEAD-MOUNTED DISPLAY, AND PROJECTION DEVICE FOR A HEAD-MOUNTED DISPLAY FOR CARRYING OUT THE METHOD

(71) Applicant: Robert Bosch GmbH, Stuttgart (DE)

(72) Inventors: Andreas Petersen, Marbach (DE); Tobias Graf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 16/626,453

(22) PCT Filed: Jun. 21, 2018

(86) PCT No.: PCT/EP2018/066617
§ 371 (c)(1),
(2) Date: Dec. 24, 2019

(87) PCT Pub. No.: WO2019/011615
PCT Pub. Date: Jan. 17, 2019

(65) Prior Publication Data
US 2020/0218075 A1 Jul. 9, 2020

(30) Foreign Application Priority Data
Jul. 12, 2017 (DE) ...................... 10 2017 211 914.4

(51) Int. Cl.
*G02B 27/01* (2006.01)
*G02B 26/10* (2006.01)

(52) U.S. Cl.
CPC ......... *G02B 27/0179* (2013.01); *G02B 26/10* (2013.01); *G02B 26/101* (2013.01);
(Continued)

(58) Field of Classification Search
CPC ............ G02B 27/0179; G02B 27/0176; G02B 27/0172; G02B 2027/0178;
(Continued)

(56) References Cited

U.S. PATENT DOCUMENTS

| 9,703,374 B1 | 7/2017 | Zhang |
| 2009/0302122 A1 | 12/2009 | Begon |

(Continued)

FOREIGN PATENT DOCUMENTS

| CN | 106170729 A | 11/2016 |
| DE | 693 18 102 T2 | 8/1998 |

(Continued)

OTHER PUBLICATIONS

International Search Report corresponding to PCT Application No. PCT/EP2018/066617, mailed Oct. 2, 2018 German and English language document) (6 pages).

*Primary Examiner* — Xuemei Zheng
(74) *Attorney, Agent, or Firm* — Maginot, Moore & Beck LLP

(57) ABSTRACT

A method for calibrating a projection device for a head-mounted display includes scanning a light beam emitted by a light source over a scanning angle range by means of a reflection element such that the light beam deflected by the reflection element passes over a head-mounted display surface region of a deflection element arranged on a lens of the head-mounted display. The surface region has at least two adjustment markings arranged on the head-mounted display, each adjustment marking arranged at a specified position relative to the surface of the deflection element arranged on a lens of the head-mounted display. The method further includes determining in which scan setting of the reflection element the at least two adjustment markings are struck by the light beam.

11 Claims, 4 Drawing Sheets

(52) U.S. Cl.
CPC ..... *G02B 27/0172* (2013.01); *G02B 27/0176* (2013.01); *G02B 2027/0154* (2013.01); *G02B 2027/0178* (2013.01)

(58) Field of Classification Search
CPC ............ G02B 2027/0174; G02B 26/10; G02B 26/101; G02B 26/0833; G02B 26/085; G02B 26/0858; G02B 26/4205; G02B 27/017
See application file for complete search history.

(56) References Cited

U.S. PATENT DOCUMENTS

| | | | | |
|---|---|---|---|---|
| 2011/0075104 | A1* | 3/2011 | Sakakibara | ............. A61B 3/10 353/31 |
| 2016/0345826 | A1* | 12/2016 | Eberl | ...................... G02B 5/32 |
| 2016/0353094 | A1 | 12/2016 | Rougeaux | |
| 2018/0184059 | A1* | 6/2018 | Arakawa | ............ G02B 27/0172 |

FOREIGN PATENT DOCUMENTS

| | | |
|---|---|---|
| DE | 10 2015 213 376 A1 | 1/2017 |
| EP | 1 840 627 A2 | 10/2007 |
| EP | 3 136 153 A1 | 3/2017 |
| JP | 2017-9992 A | 1/2017 |
| JP | 2017-116669 A | 6/2017 |
| WO | 2013/179493 A1 | 12/2013 |

* cited by examiner

METHOD FOR CALIBRATING A PROJECTION DEVICE FOR A HEAD-MOUNTED DISPLAY, AND PROJECTION DEVICE FOR A HEAD-MOUNTED DISPLAY FOR CARRYING OUT THE METHOD

This application is a 35 U.S.C. § 371 National Stage Application of PCT/EP2018/066617, filed on Jun. 21, 2018, which claims the benefit of priority to Serial No. DE 10 2017 211 914.4, filed on Jul. 12, 2017 in Germany, the disclosures of which are incorporated herein by reference in their entirety.

The present disclosure relates to a method for calibrating a projection device for a pair of smart glasses, a projection device for a pair of smart glasses for carrying out the method, a pair of smart glasses, a deflection element, a computer program, a machine-readable storage medium, and an electronic control unit.

BACKGROUND

A trend expected in the future is the wearing of smart glasses, which can overlay virtual items of image information into the field of view of a user. While current smart glasses are not transparent, for example, and thus hide the surroundings, more recent concepts follow the approach of overlaying virtual image contents with the surroundings. Overlaying virtual image contents with the surroundings, which are additionally still perceived, is referred to as augmented reality. One application is, for example, the overlay of items of information when carrying out professional activities. A mechanic could thus see a technical drawing or the smart glasses could identify specific regions of a machine by color. However, the concept is also applied in the field of computer games or other leisure activities.

Transparent head-mounted displays (HMD), for example, for applications in the field of augmented reality (AR), are an active theme in research and development. In particular the interest in the development of more cost-effective, lighter, more economical systems having small form factor is of great interest, both for industrial applications and also for the end user. One possible technical use for such a display is based in this case on the concept of a flying spot laser projector, with the aid of which the image information is written directly on the retina of the user. Such HMDs are therefore also referred to as retina scanners.

The concept is based on a single light beam, in particular a laser beam, being scanned over an angle range by means of an electronically activated scanner optical unit, for example, a MEMS (micro-electromechanical system) mirror. For example, the beam can be scanned over the glasses lens in this manner. To ensure that the scanned beam then reaches the eye of the observer or its pupil, respectively, in general a deflection of the incident beam is necessary. In this case, the law of reflection, according to which angle of incidence is equal to angle of reflection, is infringed for geometrical reasons. This can be implemented technically, for example, by the application of a holographic optical element (HOE) on the glasses lens. The HOE is typically implemented in this case by a photopolymer layer.

DE 10 2015 213 376 A1 discloses a projection device for a pair of smart glasses, a pair of smart glasses, and a method for operating a projection device for a pair of smart glasses. The projection device comprises at least one light source for emitting a light beam and at least one holographic element, which is arranged or can be arranged on a glasses lens of the smart glasses, for projecting an image onto a retina of a user of the smart glasses by deflecting and/or focusing the light beam on an eye lens of the user.

SUMMARY

The method is used for calibrating a projection device for a pair of smart glasses. The projection device comprises a scanner optical unit and a deflection element. A light source provided in the scanner optical unit is scanned by a reflection element over the deflection element, from which the light beam is incident in an eye lens of a user. The goal of the calibration is to determine the relative orientation of scanner optical unit and deflection element. For this purpose, it is ascertained at which scanning setting of the reflection element alignment marks arranged on the smart glasses are struck, wherein the position of the alignment marks in relation to the deflection element is known.

In a first step of the method, a light beam emitted by a light source is scanned by means of a reflection element over a scanning range, so that the light beam deflected by the reflection element passes over a surface region of the smart glasses which comprises at least two alignment marks arranged on the smart glasses, wherein each alignment mark is arranged at a predetermined position in relation to the surface of a deflection element arranged on a glasses lens of the smart glasses.

For this purpose, each alignment mark can be arranged on the deflection element or on a glasses frame of the smart glasses.

A light source can be understood as a light-emitting element, for example, a light-emitting diode, in particular an organic light-emitting diode, a laser diode, or an arrangement made of multiple such light-emitting elements. In particular, the light source can be designed to emit light of different wavelengths. The light beam can be used for generating a plurality of pixels on the retina, wherein the light beam can scan the retina, for example, in rows and columns or in the form of Lissajous patterns and can be pulsed accordingly. A glasses lens can be understood as a pane element manufactured from a transparent material such as glass or plastic. Depending on the embodiment, the glasses lens can be formed as a corrective lens or can comprise tinting for filtering light of specific wavelengths, for example, UV light.

A light beam can be understood as a Gaussian beam in the paraxial approximation.

A reflection element can be understood, for example, as a mirror, in particular a micromirror or an array of micromirrors, or a hologram. A beam path of the light beam can be adapted to given spatial conditions by means of the reflection element. For example, the reflection element can be implemented as a micromirror. The micromirror can be embodied as movable, for example, it can comprise a mirror surface which can be inclined around at least one axis. Such a reflection element offers the advantage of a particularly compact structural form. It is furthermore advantageous if the reflection element is designed to change an angle of incidence and, additionally or alternatively, a point of incidence of the light beam on the holographic element. The holographic element can thus be scanned flatly, in particular, for example, in rows and columns, using the light beam.

A scanning angle range is understood as a solid angle over which the light beam is scanned. The projection of the solid angle on the surface of the smart glasses results in the surface region which the scanned light beam passes over.

Each alignment mark is arranged at a predetermined position in relation to the surface of the deflection element. A geometrical relationship can thus advantageously be established between the scanning setting of the reflection element and the point of incidence of the scanned beam on the smart glasses, for example, the deflection element or the glasses frame. The deflection element can be a holographic element or a free-form mirror.

A holographic element can be understood, for example, as a holographic optical element, abbreviated HOE, which can fulfill the function of a lens, a mirror, or a prism. Depending on the embodiment, the holographic element can be selective for specific colors and angles of incidence. In particular, the holographic element can fulfill optical functions which can be imprinted using simple point light sources in the holographic element. The holographic element can thus be produced very cost-effectively.

The holographic element can be transparent. Virtual items of image information generated by the projection unit can thus be overlaid with items of image information from the surroundings.

A light beam can be deflected onto a retina of a wearer of the smart glasses by a holographic element arranged on a glasses lens of a pair of smart glasses in such a way that the wearer perceives a sharp virtual image. For example, the image can be projected directly onto the retina by scanning a laser beam over a micromirror and the holographic element.

Such a projection device can be implemented comparatively cost-effectively on small structural space and enables an image content to be brought into a sufficient apparent distance from the wearer. The superposition of the image content with the surroundings is thus enabled. Because the image can be written by means of the holographic element directly onto the retina, a DLP chip (DLP=digital light processing) can be omitted. Furthermore, a particularly large depth of field can thus be achieved.

In general, the reflection behavior on the surface of the holographic element is different at each point. As already mentioned above, it is generally not true that the angle of incidence is equal to the angle of reflection. The subregion of the surface of the holographic element which is used to deflect the light beam to the eye of a user is referred to as the functional region. In principle, the same statements apply for a free-form mirror as for a holographic element. Each alignment mark has a predetermined and known relationship to the functional region of the deflection element.

In general, two alignment marks are sufficient to achieve a calibration for both deflection directions of the reflection element. However, it is preferable for at least two alignment marks, in particular at least four alignment marks, to be used in the method. It is particularly preferable for four alignment marks to be used in the method. This has the advantage that the calibration accuracy is enhanced in relation to the case using only two alignment marks.

The alignment marks are preferably arranged outside or at the edge of the primary field of view on the deflection element. This has the advantage that alignment marks do not negatively affect the user and the calibration can thus also be performed while the user wears the smart glasses. Because of the greater distance of the alignment marks to one another, a greater accuracy is advantageously achieved, however.

The deflection element preferably comprises a primary region, which is used to operate the smart glasses normally, and a secondary region adjoining externally thereon, which is only used for alignment purposes. The primary region corresponds to the above-mentioned functional region.

According to a further embodiment, the alignment marks are arranged on the glasses frame of the smart glasses. This has the advantage that the light beams required for the alignment extend separately from the light beams incident on the deflection element and can thus also be analyzed separately.

In a further step of the method, it is defined at which respective scanning setting of the reflection element the at least two alignment marks are struck by the light beam. The term scanning setting is understood as a setting of the reflection element which deflects the light beam by a determined angle. The angle is to be understood in this case as an angle in space which requires two angle specifications originating from the surface of the planar reflection element to be clearly defined. Alternatively, the scanning setting can also be called angle setting.

According to one embodiment, a unique functional relationship is determined between the scanning setting of the reflection element and the point of incidence of the light beam on the surface of the smart glasses. This has the advantage that for each scanning setting of the reflection element, the point of incidence of the light beam on the surface of the smart glasses, i.e. on the deflection element or on the glasses frame, is known. If the light beam is incident on the deflection element, because of the knowledge of the properties of the deflection element, it is also known for each point of incidence of the light beam on the surface of the deflection element to where the light beam is reflected.

According to still a further embodiment, the determination of the respective scanning setting of the reflection element at which the at least two alignment marks are struck by the light beam is performed by the light beam being detected by respective detectors arranged on the alignment marks. This arrangement of detectors on the alignment marks has the advantage that it can be detected very reliably when an alignment mark is struck by a light beam.

Alternatively, the determination of the respective scanning setting of the reflection element at which the at least two alignment marks are struck by the light beam can be performed by the light beam being deflected in each case by holographic or diffractive alignment elements, which are each arranged on the alignment marks, in a predetermined direction in each case, and being detected after the respective deflection. This has the advantage that detectors do not have to be attached to the alignment marks, i.e. to the surface of the deflection element. In this way, the projection device or the smart glasses become lighter and are freed of electronic components. The use of holographic or diffractive alignment elements has the advantage that they are light, which results in a reduced weight of the projection device or the smart glasses. For the case in which the deflection element is embodied as a holographic element, one advantage is that the alignment marks can be manufactured homogeneously with the deflection element. In this embodiment, the alignment marks and the deflection element are arranged in the same layer, which is embodied as a holographic element.

The respective predetermined direction in which the light beam is deflected by the holographic or diffractive alignment elements can be identical for every holographic or diffractive alignment element. According to another embodiment, the respective predetermined direction can also be different, however. In this case, it is also possible that the light beam is deflected by every holographic or diffractive alignment element onto the same point.

According to one embodiment, the light beam is deflected by the holographic or diffractive alignment elements in each case onto a common point, which can be referred to, for example, as the intersection point. In this embodiment, the position of the intersection point does not have to be known, it is solely important that all four holographic alignment elements deflect the respective light beams onto the intersection point.

According to a further embodiment, the light beam is deflected in each case by the holographic or diffractive alignment elements in parallel to the respective surface normal. It is to be noted in this case that if the holographic element is a curved surface, the respective surface normals do not extend in parallel to one another.

According to a further embodiment, the light beam is deflected in each case by the holographic or diffractive alignment elements in the same direction, which can deviate locally from the surface normals.

A planar detector can be applied in a plane for detecting the light beams which are reflected by the holographic or diffractive alignment elements, wherein the plane is preferably arranged on the surface of the holographic element for the case in which the holographic element is flat. In this embodiment, the light beams solely have to be detected on the detector arranged in the detection plane, the positions where the light beams are incident on the detector do not have to be known.

According to a further embodiment, the light beam is reflected back in each case by the holographic or diffractive alignment elements in the direction of the reflection element. In this case, the detection can advantageously take place via a detection unit integrated in the scanner module or in the light source, for example a photodiode. For this purpose, the scanner module is understood as the unit which controls the reflection element. According to this embodiment, it is furthermore preferable if the light beam is reflected back into itself. In this case, the light beam is reflected back into the light source where it can advantageously be detected by interference with the radiation generated in the laser, the so-called self-mixing interference (SMI), for the case in which a laser is used as the light source.

According to a further embodiment, the light beam can be deflected in each case by the holographic or diffractive alignment elements in the direction of an eye lens of a user. This has the advantage that a camera or a user can detect the light beam. A known illumination pattern is preferably used in this case if the scanned beam is incident on the test region, i.e. an alignment mark.

According to one refinement, the light source which is used for the present method for calibration is also used for the image generation. This has the advantage that an additional light source does not have to be used for the calibration.

A wavelength of the light beam is preferably in a wavelength range not visible to humans, for the advantage that a calibration is not noticed by a user of the smart glasses. A calibration can thus also be carried out during the usage of the smart glasses. In this case, the calibration can be performed by a laser integrated into the projection device. A light source of an existing eye tracking system can also be used. The range of near infrared (NIR), in particular the range between approximately 700 nm to 1400 nm, can be selected as the wavelength of the changed laser beam. Infrared radiation has the advantage that it is not visible to the human eye and therefore does not interfere with the sensory perception at the eye. Furthermore, it is not harmful to the eye in the case of correspondingly low intensity.

Moreover, suitable laser sources exist which can advantageously be used. In this case, the alignment marks can also be attached in the field of view, i.e. in the primary region.

According to one preferred embodiment, the light beam of the light source is coupled in via an interface from outside the smart glasses. In this case, a light source used for the image generation is not identical to the light source used for the calibration. For this purpose, the coupling of the light beam can preferably take place from an external test bench via a defined interface. This has the advantage that a test bench can be used for the calibration, which checks a variety of smart glasses and is set up for the long term. Such a test bench can therefore also calibrate such smart glasses with high accuracy and high reliability.

The scanning of the light beam emitted by the light source by means of the reflection element over the scanning angle range can be performed automatically or manually.

According to one embodiment, the calibration takes place automatically by a control unit reading out and processing the detector signals and regulating the scanner optical unit to obtain the position for a maximum signal. This has the advantage that the calibration does not have to be carried out by a user.

According to still a further embodiment, the calibration is performed manually, wherein the detector signal is communicated to the user via an optical or acoustic signal. This has the advantage that an automated calibration which is possibly susceptible to interference is avoided.

A further aspect of the disclosure relates to the projection device for the smart glasses for carrying out the above-described method for calibrating the projection device. The projection device comprises at least one light source for emitting a light beam and at least one deflection element, which is arranged or can be arranged on a glasses lens of the smart glasses, for projecting an image onto a retina of a user of the smart glasses by deflecting and/or focusing the light beam onto an eye lens of the user. The projection device is characterized in that the projection device comprises at least two alignment marks, and each alignment mark is arranged at a predetermined position in relation to the surface of the deflection element. The projection device has the advantage that it is simple to calibrate. Further advantages were already described above in conjunction with the method.

The disclosure furthermore comprises a deflection element for a projection device for a pair of smart glasses. The deflection element comprises at least two alignment marks, wherein each alignment mark is arranged at a predetermined position in relation to the surface of the deflection element. The deflection element can advantageously be calibrated by the above-described method on the basis of the alignment marks arranged thereon. The deflection element has the advantage that it is simple to calibrate. Further advantages were already described above in conjunction with the method.

The disclosure furthermore comprises a computer program which is configured to carry out the described steps of the method in order to be able to carry out a calibration of the projection device using this computer program. Furthermore, the disclosure comprises a machine-readable storage medium, on which such a computer program is stored, and an electronic control unit, which is configured to operate a projection device for a pair of smart glasses or a pair of smart glasses by means of the described steps of the method. Such an electronic control unit can be integrated, for example, as a microcontroller into a projection device or a pair of smart glasses.

BRIEF DESCRIPTION OF THE DRAWINGS

Exemplary embodiments of the disclosure are illustrated in the drawings and are explained in greater detail in the following description.

DETAILED DESCRIPTION

Figure 1:
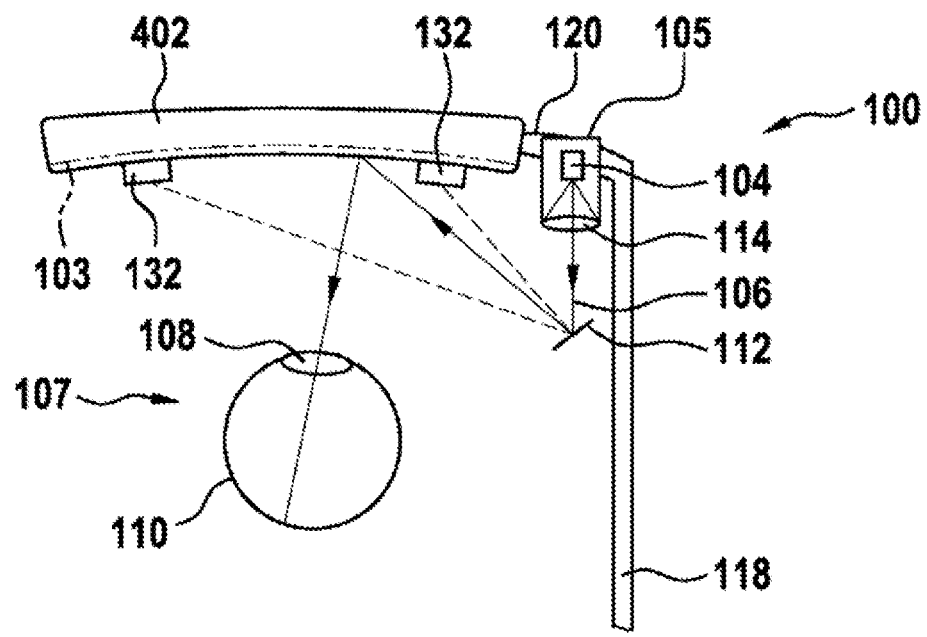
FIG. 1 shows a schematic illustration of a projection device according to one embodiment.

FIG. 1 shows the functionality in principle of the projection device 100. A light beam 106 emitted from a laser diode as the light source 104 is collimated by means of a lens as a collimation element 114 and guided in the direction of a micromirror as a reflection element 112. The reflection element 112 deflects the light in the direction of the deflection element embodied as a holographic element 103. The holographic element 103 is applied to a glasses lens 402. The light beam 106 deflected by the holographic element 103 is then incident on an eye lens 108, from which the light beam 106 is focused on the retina 110 of an eye 107 of a user.

The light source 104 is arranged in a housing 105 fastened on the glasses frame 120. The collimation element 114 is arranged at the exit of the housing 105. The light source 104, the collimation element 114, and the reflection element 112 can be housed in a common housing (not shown), wherein the light beam 106 reflected by the reflection element 112 is decoupled through a window arranged on one side of the housing. This housing can be fastened on the glasses earpiece 118 or on the glasses frame 120.

The projection device 100 furthermore comprises two alignment marks 132, which are applied to the holographic element 103.

Figure 2:
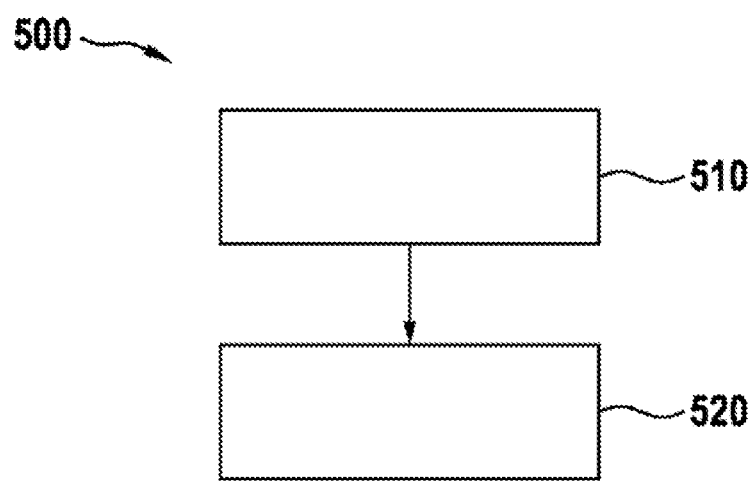
FIG. 2 schematically shows a flow chart of a method according to one embodiment.

FIG. 2 shows a flow chart of the method 500 for calibrating a projection device 100 for a pair of smart glasses. In a first step 510 of the method 500, a light beam 106 emitted from a light source 104 is scanned by means of a reflection element 112 over a scanning angle range, so that the light beam 106 deflected by the reflection element 112 passes over a surface region of a deflection element arranged on a glasses lens 402 of the smart glasses, which deflection element is embodied as a holographic element 103, and which comprises at least two alignment marks 132, wherein each alignment mark 132 is arranged at a predetermined position on the surface of the holographic element 103. In a second step 520 of the method 500, it is determined at which respective scanning setting of the reflection element 112 the at least two alignment marks 132 are struck by the light beam 106.

Figure 3:
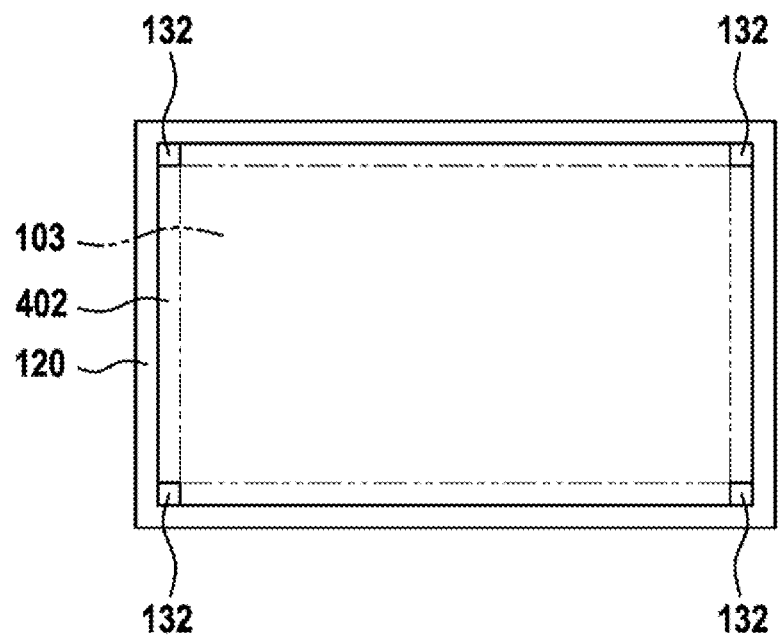
FIG. 3 shows a schematic illustration of a deflection element according to one embodiment.

FIG. 3 shows a deflection element for a projection device 100 for a pair of smart glasses 400. The deflection element is in the present case a holographic element 103. The holographic element 103, which is embodied as a layer, is applied to a glasses lens 402. The holographic element 103 has a rectangular shape. An alignment mark 132 is arranged on each of the four corners of the holographic element 103. The glasses lens 402 is framed by a glasses frame 120.

Figure 4:
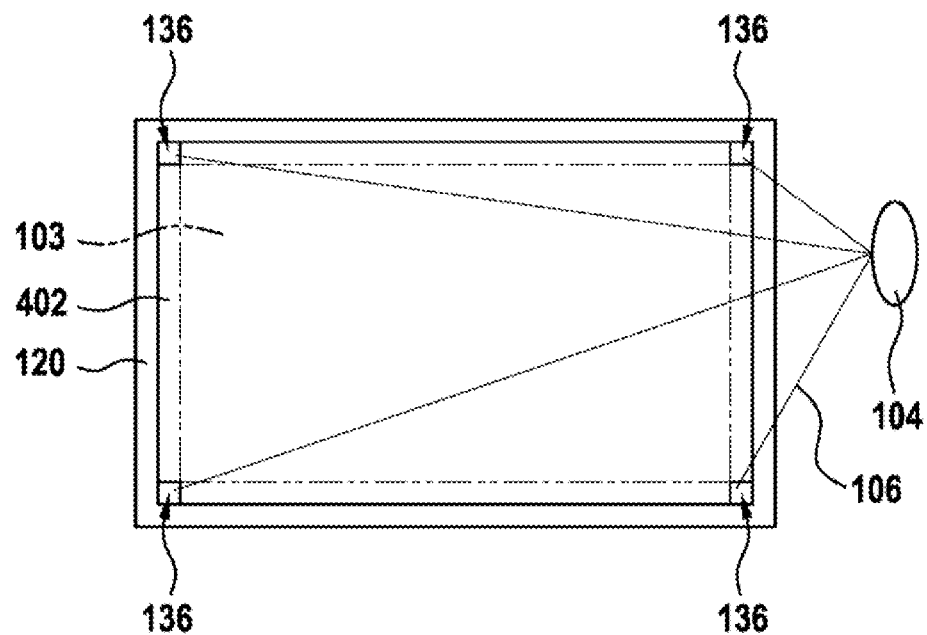
FIGS. 4 to 6 each schematically illustrate a course of light beams in a method according to one embodiment.

FIG. 4 shows the deflection element of FIG. 3 embodied as a holographic element 103, wherein a detector 136 is additionally arranged on each of the four alignment marks 132. According to one embodiment of the method, a light beam 106 emitted by the light source 104 is scanned over the surface of the holographic element 103, wherein the light beam 106 also passes over the four detectors 136. The light source 104 and the light beam 106 are only schematically shown here, in order to illustrate the scanning of the light beam 106. The reflection element 112 is not shown here. Since the positions of the detectors 136 on the holographic element 103 are known, it can be determined at which scanning setting of the reflection element 112 the detectors 136 are struck. A functional relationship can be determined therefrom between the point of incidence of the light beam 106 on the surface of the holographic element 103 and the scanning setting of the reflection element 112.

Figure 5:
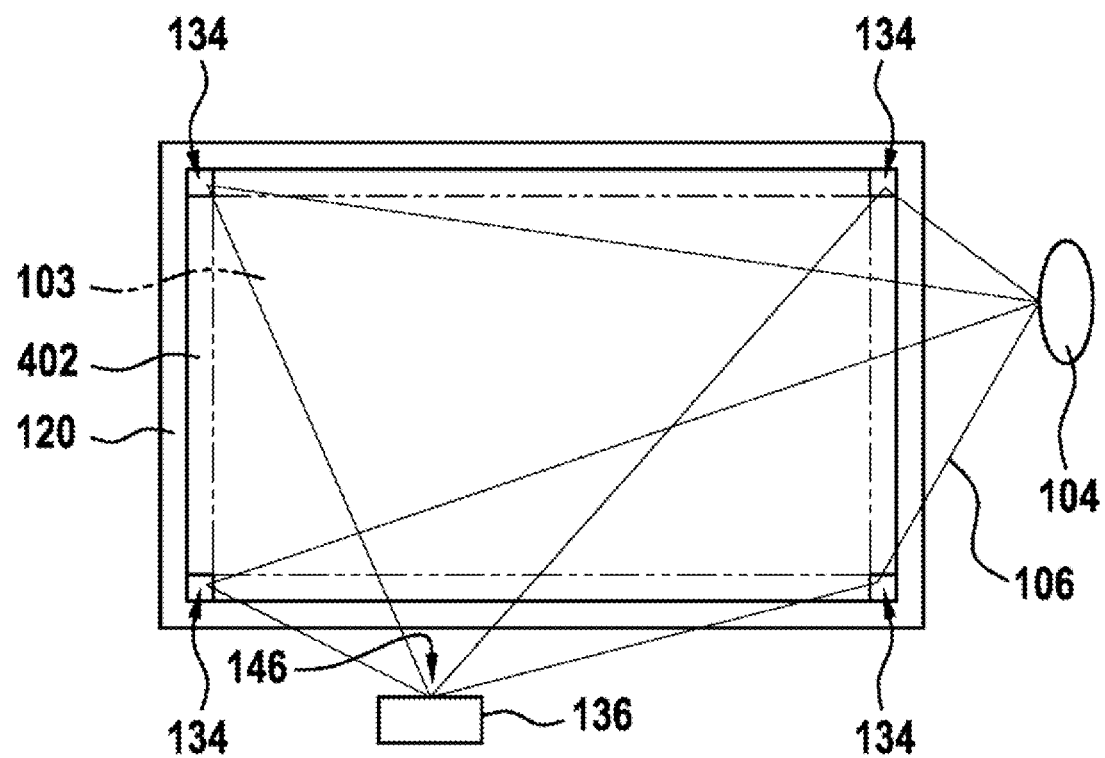

FIG. 5 shows a similar embodiment as FIG. 4. In contrast to the embodiment of FIG. 4, instead of the four detectors 136, four holographic alignment elements 134 are arranged on the four alignment marks 132. In the present embodiment, the four holographic alignment elements 134 each deflect the light beam 106 incident thereon onto a common point, the intersection point 146. A detector 136 is arranged at the intersection point 146, which detects the light beam 106 which is deflected by the four holographic alignment elements 134. In this embodiment, the position of the intersection point 146 does not have to be known, it is solely important that all four holographic alignment elements 134 deflect the respective light beams 106 onto the intersection point 146. Similar to the embodiment of FIG. 3, a functional relationship can then be determined between the point of incidence of the light beam on the surface of the holographic element 103 and the scanning setting of the reflection element 112.

Figure 6:
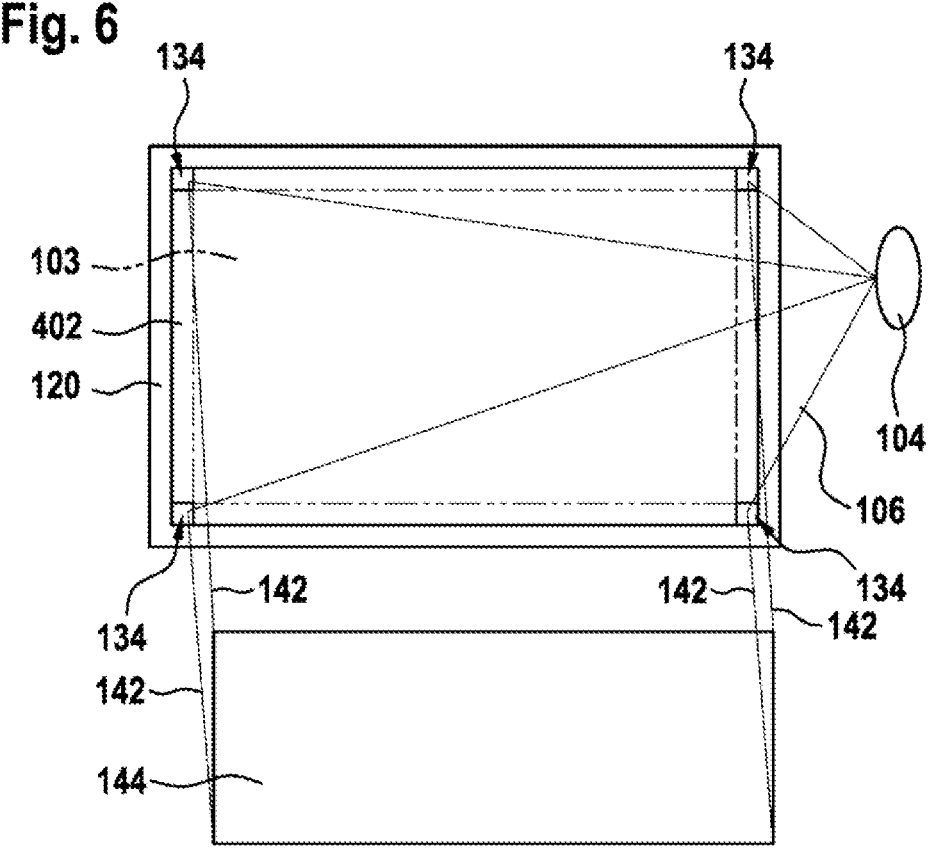

FIG. 6 shows a similar embodiment as FIG. 5. In contrast to the embodiment of FIG. 5, the four holographic alignment elements 134 deflect the light beams 106 incident thereon in parallel to the respective surface normal 142. It is to be noted in this case that if the holographic element 103 is a curved surface, the respective surface normals 142 do not extend in parallel to one another. A planar detector can be attached in a detection plane 144 for detecting the four light beams 106, which are reflected by the four holographic alignment elements 134. If the four illustrated surface normals 142 are each of equal length, and the holographic element 103 is flat, the detection plane 144 is parallel to the plane of the holographic element 103. In this embodiment, the four light beams 106 solely have to be detected on the detector arranged in the detection plane 144, the positions where the light beams are incident on the detector do not have to be known. Then, similarly to the embodiment of FIG. 4, a functional relationship can be determined between the point of incidence of the light beam on the surface of the holographic element 103 and the scanning setting of the reflection element 112.

Figure 7:
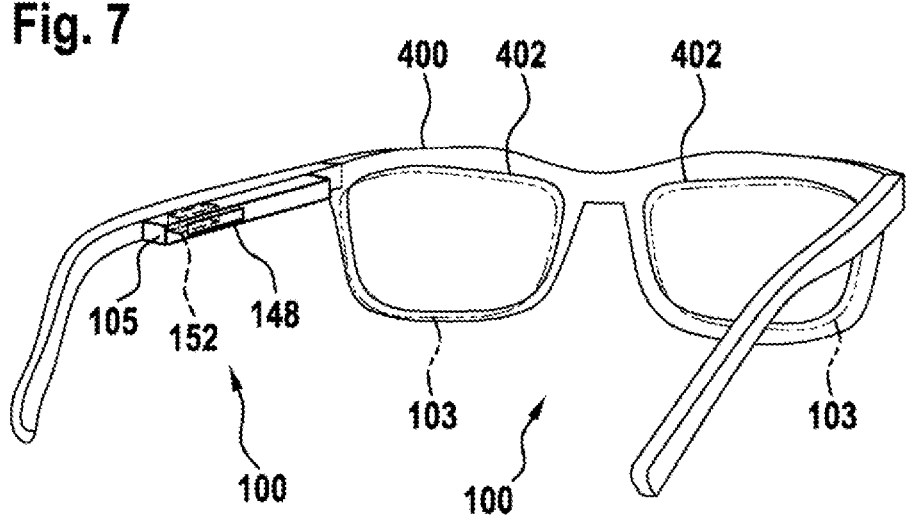
FIG. 7 schematically shows a pair of smart glasses according to one embodiment in an isometric illustration.

FIG. 7 shows a schematic illustration of a pair of smart glasses 400 having a projection device 100 according to one exemplary embodiment. The projection device 100 comprises in this case a scanner optical unit 152 and the holographic element 103. The scanner optical unit 152 is arranged in the housing 105 and emits a light beam 106 (not shown) through the exit window 148 onto the holographic element 103. The pair of smart glasses 400 comprises a glasses lens 402, on which the holographic element 103 is arranged. For example, the holographic element 103 is implemented as part of the glasses lens 402. Alternatively, the holographic element 103 is implemented as a separate element and is connected by means of a suitable joining method to the glasses lens 402.

The invention claimed is:

1. A method for calibrating a projection device for a pair of smart glasses, the method comprising:

scanning a light beam emitted by a light source with a reflection element over a scanning angle range such that the light beam deflected by the reflection element passes over a surface region of the smart glasses, which comprises at least two alignment marks arranged on the smart glasses, wherein each alignment mark of the at least two alignment marks is arranged at a predetermined position in relation to a surface of a deflection element arranged on a glasses lens of the smart glasses; and determining at which respective scanning setting of the reflection element the at least two alignment marks are struck by the light beam by (i) deflecting the light beam in a predetermined direction with respective holographic or diffractive alignment elements, each of which is arranged on one of the at least two alignment marks, and (ii) detecting the light beam after the respective deflection.

2. The method as claimed in claim 1, further comprising: determining a unique functional relationship between the scanning setting of the reflection element and a point of incidence of the light beam on the surface of the smart glasses.

3. The method as claimed in claim 1, wherein the determination of the respective scanning setting of the reflection element at which the at least two alignment marks are struck by the light beam includes detecting the light beam with detectors arranged on each alignment mark.

4. The method as claimed in claim 1, wherein the light beam is reflected back by the respective holographic or diffractive alignment elements in a direction toward the reflection element.

5. The method as claimed in claim 1, wherein the light beam is deflected by the respective holographic or diffractive alignment elements in a direction toward an eye lens of a user.

6. The method as claimed in claim 1, wherein the light source is also used for image generation.

7. The method as claimed in claim 1, wherein the method is stored in a computer program.

8. The method of claim 7, wherein the computer program is stored on a machine-readable storage medium.

9. A projection device for a pair of smart glasses, the projection device comprising:

at least one light source configured to emit a light beam;

at least one deflection element arranged on a glasses lens of the smart glasses and configured to project an image onto a retina of a user of the smart glasses by deflecting and/or focusing the light beam on an eye lens of the user;

at least two alignment marks, each alignment mark of the at least two alignment marks arranged at a predetermined position in relation to a surface of the deflection element; and a reflection element configured to scan the light beam over a scanning angle range such that the light beam deflected by the reflection element passes over a surface region of the smart glasses that comprises the at least two alignment marks, wherein the projection device is configured to determine a respective scanning setting of the reflection element at which the at least two alignment marks are struck by the light beam by (i) deflecting the light beam in a predetermined direction with respective holographic or diffractive alignment elements, each of which is arranged on one of the at least two alignment marks, and (ii) detecting the light beam after the respective deflection.

10. The projection device as claimed in claim 9, wherein the deflection element is arranged on a glasses lens of the pair of smart glasses.

11. The projection device as claimed in claim 9, further comprising:

an electronic control unit configured to calibrate the projection device by operating the scanning device to scan the light beam over the scanning angle range and determining the respective scanning setting.

* * * * *